United States Patent [19]

Keller

[11] 3,949,890

[45] Apr. 13, 1976

[54] BALE HANDING METHOD AND APPARATUS

[75] Inventor: Alex Jacques Keller, Gastonia, N.C.

[73] Assignee: Automatic Material Handling, Inc., Gastonia, N.C.

[22] Filed: Oct. 24, 1973

[21] Appl. No.: 409,275

[52] U.S. Cl. ................. 214/152; 214/305; 214/652

[51] Int. Cl.$^2$ ......................................... B65G 61/00

[58] Field of Search ........ 214/152, 1 Q, 652; 53/24; 29/426, 427, 200 D; 100/3, 100

[56] References Cited

UNITED STATES PATENTS

| | | | |
|---|---|---|---|
| 3,180,514 | 4/1965 | Horton | 214/652 |
| 3,429,095 | 2/1969 | Huson | 53/24 |
| 3,438,525 | 4/1969 | Nutter | 214/652 |
| 3,567,053 | 3/1971 | Willock | 214/652 |
| 3,590,731 | 7/1971 | Nichols | 100/3 X |

*Primary Examiner*—Robert B. Reeves
*Assistant Examiner*—Norman L. Stack, Jr.
*Attorney, Agent, or Firm*—Richards, Shefte & Pinckney

[57] ABSTRACT

An improved method and apparatus are described for removing the wrapping from a bale of cotton, or other fibrous material, and precisely positioning the bale in a predetermined location for further processing with greater accuracy than heretofore possible and without the necessity of heavy manual labor heretofore required.

2 Claims, 7 Drawing Figures

BALE HANDING METHOD AND APPARATUS

BACKGROUND OF THE INVENTION

Cotton or other fibrous material, such as synthetic staple fibers, conventionally arrive at the processing plant in the form of a bale. Each bale comprises a mass of fibers compressed under considerable pressure into an elongated cube of predetermined approximate dimensions weighing from 400 to 650 pounds and having a surrounding wrapping of a covering material, normally burlap sacking or polyethylene with the fibers being held in a highly compressed condition and the burlap being held about the fibers by a plurality of flexible steel retaining bands.

Historically, removal of the wrapping and restraining bands in order to permit processing of the fibers has been essentially a hand operation involving tipping of the bale from its usual vertical storage position onto its side, cutting the steel bands on the bale, removing the upper half of burlap wrapping from the bale then manually rolling the bale over to remove the wrapping from the other half of the bale. Removal of the wrapping by this manual procedure is obviously a most strenuous task in view of the weight of the bales. Furthermore, the operation is hazardous because the steel restraining bands are placed under great pressure to retain the fibrous mass comprising the bale in a highly compressed state, and the steel bands spring outwardly with great force when clipped. After a bale is opened by clipping the steel bands the fibrous mass expands or "blossoms" with the release of pressure with the consequence that the bale is difficult to move as a unit. Therefore, according to the prior art, the opening of the bales as just described occurs in the opening room as near as practicable to the fiber feeding machines or the first in a series of machines which successively process the fibers into yarn. It is conventional practice to then manually carry an armful of fibers from each of a plurality of opened bales to the hoppers of the fiber processing machines. Because of the difficulty in manually opening the bales and the necessity of physically moving them during the opening process, it is nearly impossible to position the bales at predetermined positions with the precision required when using automated material handling equipment to carry fibers from the opened bales to the hoppers such as disclosed, for example, in U.S. application Ser. No. 275,942 filed in the U.S. Pat. Office July 28, 1972, by Alex J. Keller, now U.S. Pat. No. 3,777,908.

SUMMARY OF THE INVENTION

The present invention overcomes the aforesaid difficulties by providing an improved method and apparatus for removing the steel straps or restraining bands and burlap or plastic wrap from a bale of fibers, sometimes referred to in the industry as "cleaning" the bale, with a substantial reduction in the manual labor involved and in the hazards to the worker. Also, during the process of "cleaning" the bale, the bale is retained in condition permitting it to be precisely located at any predetermined position in a bale assembly area for subsequent treatment by automated machinery, as more fully described in my co-pending application entitled FIBER HANDLING SYSTEM. Ser. No. 409,297.

Essentially, the apparatus of the present invention comprises a lift fork, lift truck or other unit having a pair of parallel variably spaced forks which may be rotated in unision 360° about a common axis, preferably horizontal. A pallet or truck is adapted for use with the variably spaced and rotatable forks to facilitate subsequent handling of the bale after it is "cleaned." The method of the present invention employs a plurality of steps involving manipulation of a bale to different positions for sequential work operations which will be described in greater detail hereinafter.

It is an object of the invention to provide an improved apparatus for handling bales during and after their "cleaning" or removal of the burlap wrapping therefrom.

It is another object of the present invention to provide an improved method for removing the wrapping from a fiber bale.

Another object of the invention is to provide an improved wheeled pallet having utility during the removal of the wrapping from a bale and subsequent transportation and precise positioning of a cleaned bale to a predetermined location.

Other objects of the present invention, if not specifically set forth herein, will be obvious to the skilled artisan upon a reading of the detailed description of the invention which follows, when taken in conjunction with the drawings.

DESCRIPTION OF THE PREFERRED EMBODIMENT

Figure 2:
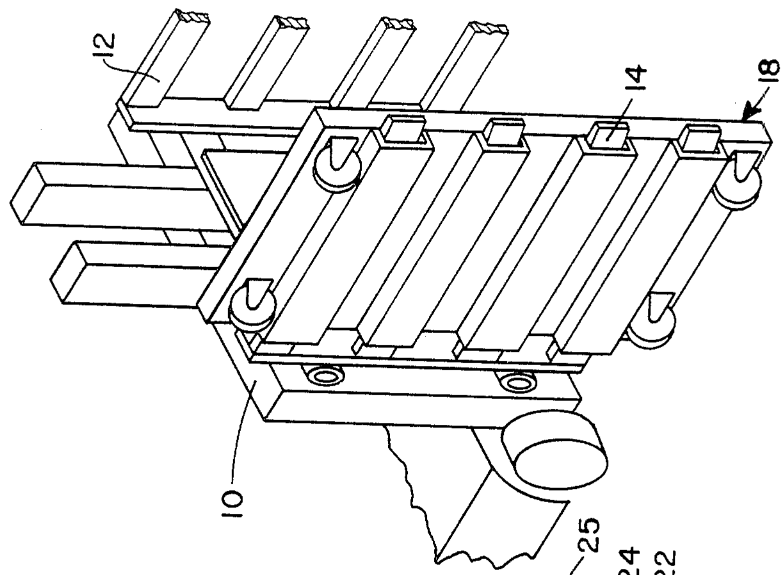
FIG. 2 is a perspective view of the movable forks, with parts broken away, and showing the pallet supported thereon in a vertical position in preparation for handling of a bale.
Figure 1:
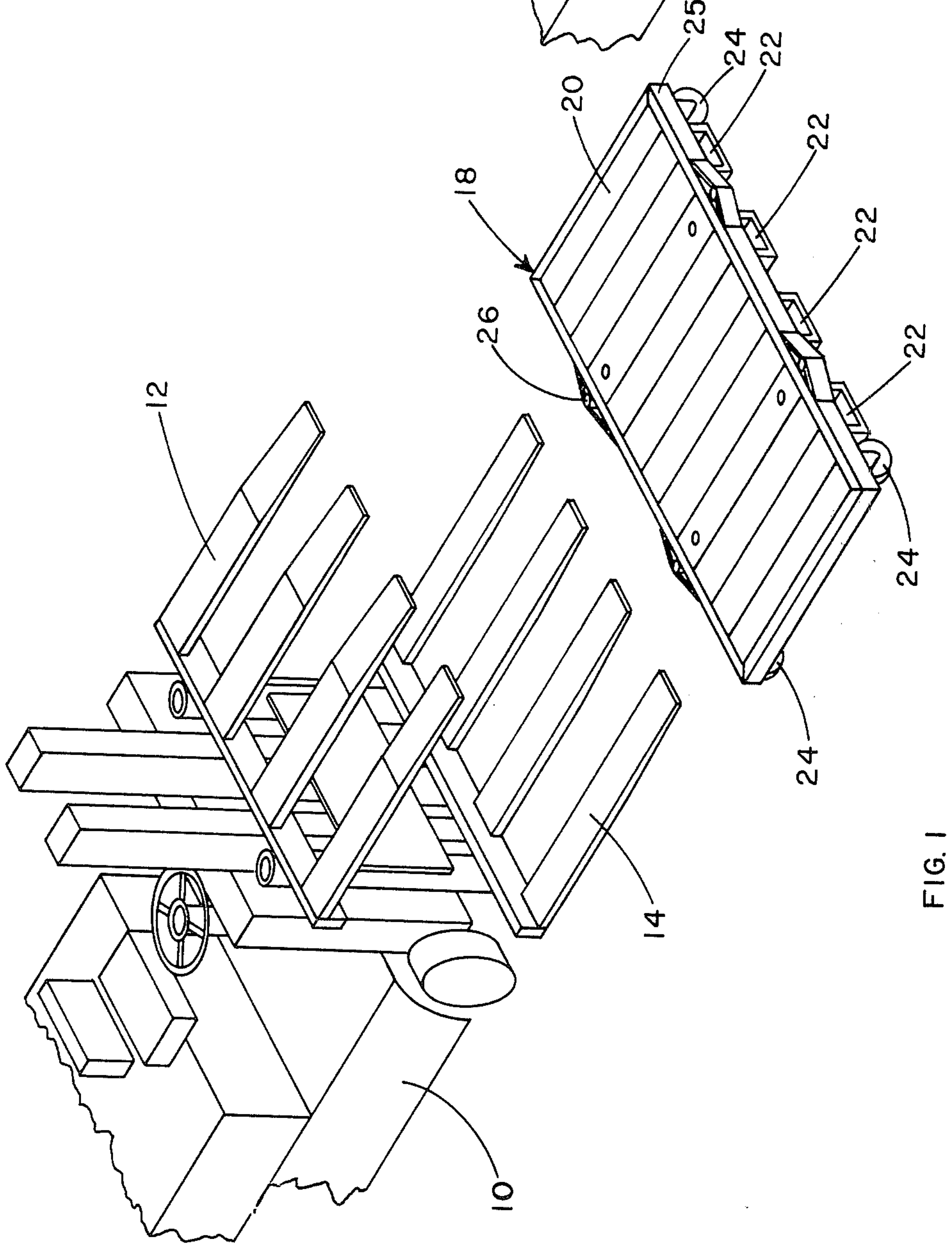
FIG. 1 is a perspective view of the movable forks and pallet comprising the apparatus of the present invention.

As illustrated in FIG. 1, the apparatus employed in the present invention comprises a pair of variably spaced forks 12 and 14 which are rotatable in unison about a common axis, preferably horizontal, and may be mounted on a lift truck 10. Lift truck 10 is used in conjunction with a pallet, generally indicated at 18, which is comprised of a bed 20 and a plurality of transversely extending channel members 22 secured beneath the bed 20 and adapted to receive the tines of one of the forks on life truck 10. A plurality of wheels or casters may be also mounted beneath the bed to facilitate movement of the pallet and its contents. Sidewalls 24 of pallet 18 have located therein a plurality of sockets 26 adapted to receive removable retaining walls 28 (FIG. 7) for retaining a bale therebetween. Angled strips or spacers 29 project laterally about the sockets 26. A separate pallet is provided for each bale in the bale assembly area, and the pallets are uniformly dimensioned to provide the precise spacing of the bales necessary in the assembly area. Auxiliary sockets 26' are spaced inwardly from sockets 26 to accommodate smaller bales, whereby a standard size pallet can be used with different bale sizes.

In the practice of the present invention, the tines of one of the forks, e.g. fork 14 are inserted within channels 22 of pallet 18. The pallet is then lifted and the forks are rotated 90° to position forks 12 and 14 and pallet 18 in a vertical position.

Figure 3:
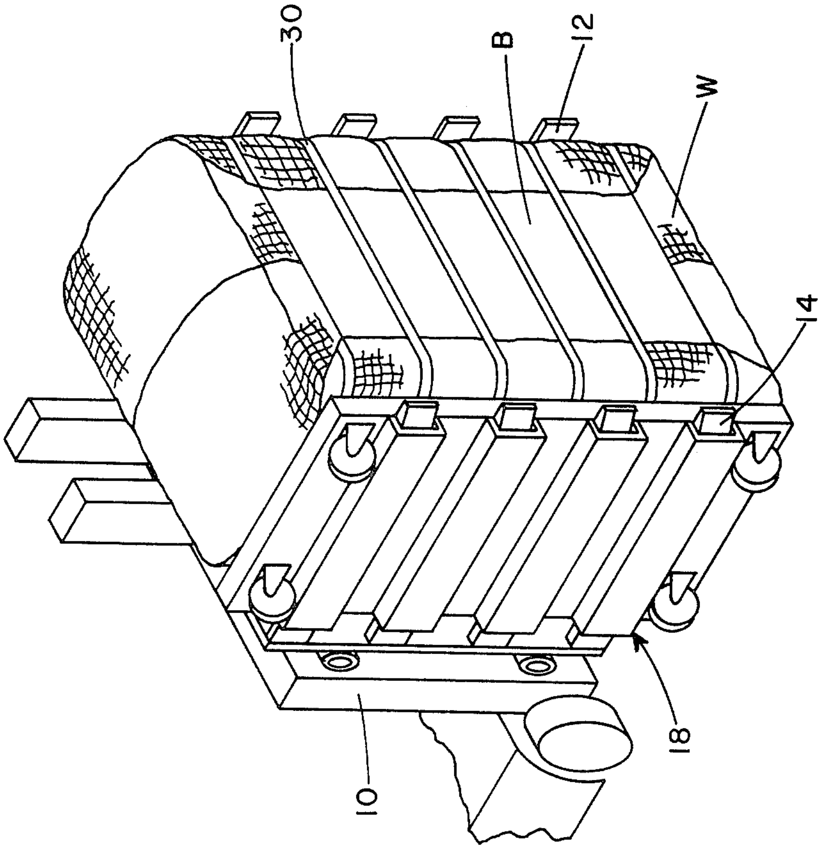
FIG. 3 is a perspective view of the pallet and forks clamped on either side of a vertically positioned bale.

Fork 12 and fork 14 with pallet 18 positioned thereon are then moved to opposite sides of a bale B which is in a vertical position, i.e., resting on one end as shown in FIG. 3.

Figure 4:
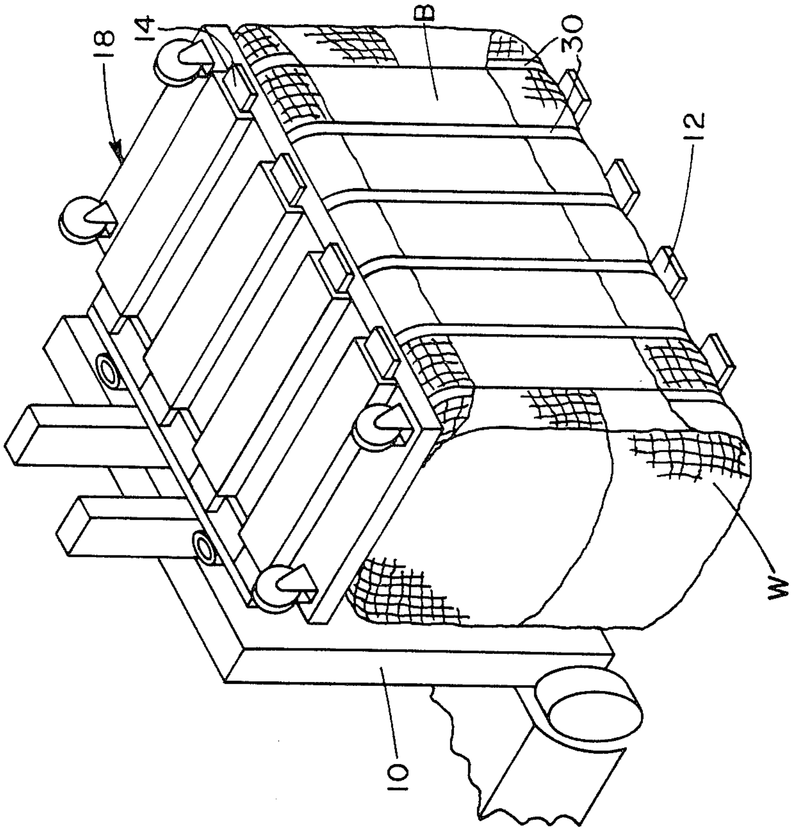
FIG. 4 is a perspective view showing the forks rotated an additional 90° so that the pallet is upside down above the bale and the bale is clamped between the pallet and opposed fork.
Figure 5:
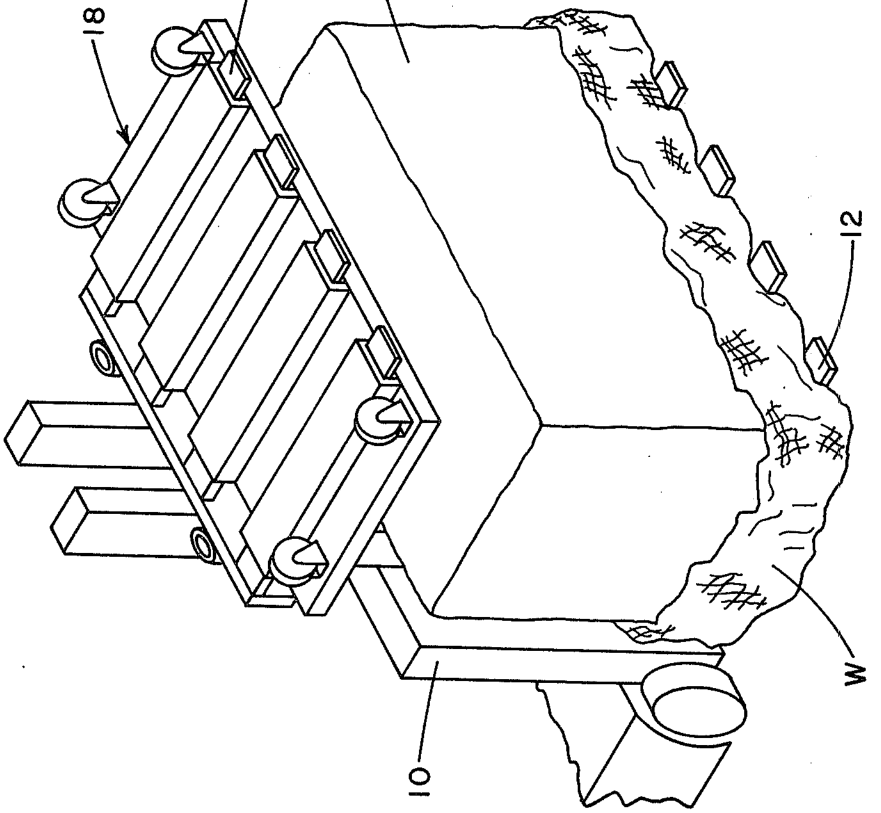
FIG. 5 is a perspective view showing the bale with the burlap wrapping and straps removed from the upper portion thereof and the pallet lifted from the bale.

The forks 12 and 14 are then moved toward each other to compress bale B therebetween and are then rotated an additional 90° to a first position with pallet 18 above bale B as shown in FIG. 4. The restraining bands or steel straps 30 are then clipped by the worker. Since the bale is in a compressed condition between the forks, the hazards historically associated with this operation are eliminated. Fork 14 and pallet 18 are then moved away from bale B and wrapping W is removed from the upper surface and sides of the bale B as illustrated in FIG. 5.

Figure 6:
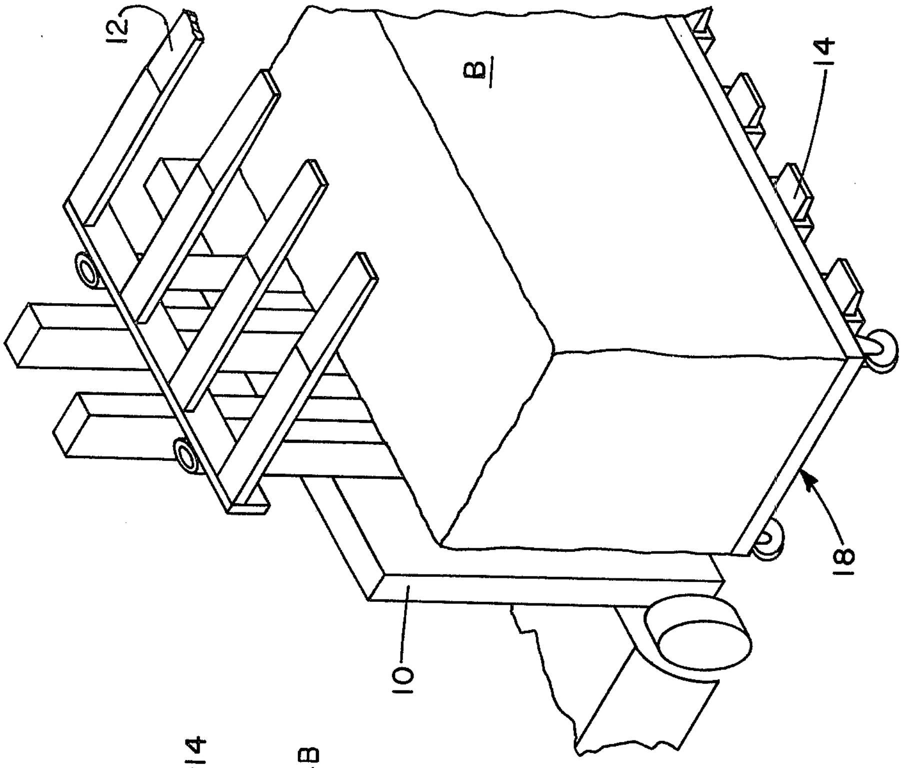
FIG. 6 is a perspective view after rotation of the forks 180° so that the bale, with wrapping not removed, rests upon the pallet in an upright position on the floor, with the opposed fork lifted from the bale.

Pallet 18 is once again pressed against bale B and the forks are rotated 180° to locate the pallet and bale in a second position with the pallet 18 beneath the bale B. Fork 14 is then moved downwardly to permit wheels 24 on pallet 18 to rest upon the floor and fork 12 is moved out of contact with bale B to produce the configuration shown in FIG. 6.

Figure 7:
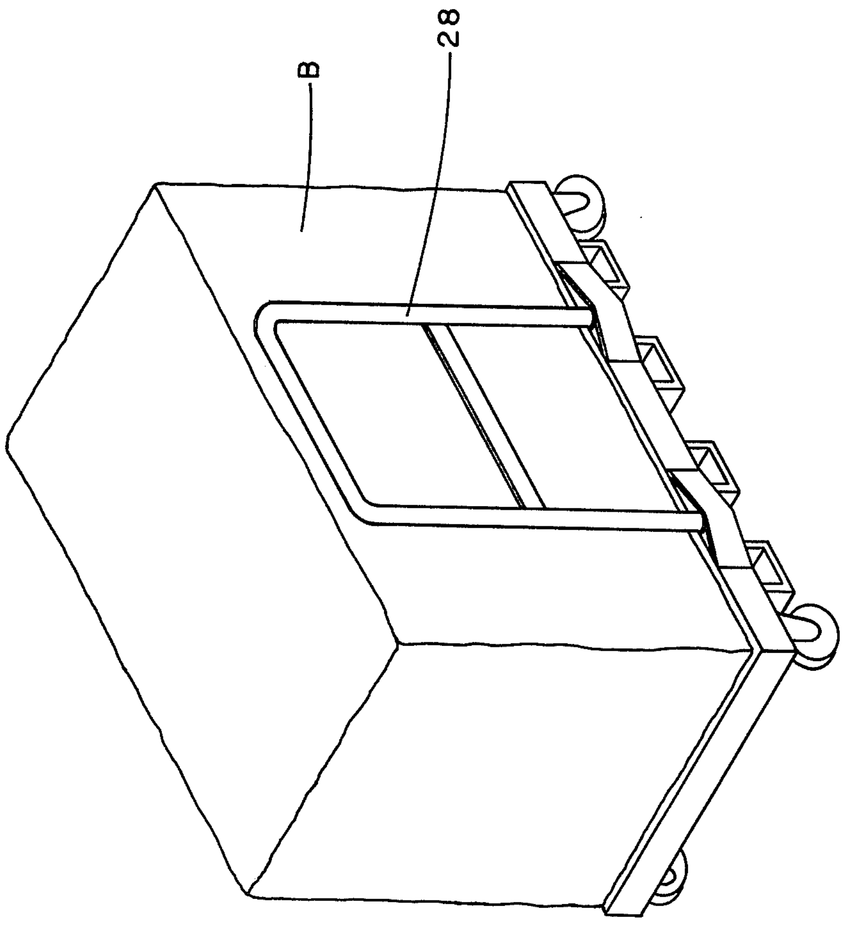
FIG. 7 is a perspective view showing the bale supported by the pallet in condition for transportation to an assembly area.

The forks are then retracted from pallet 18 and restraining walls 28 are positioned within sockets 26 in the side walls of pallet 18 to produce the configuration shown in FIG. 7. The pallet is provided with an auxiliary set of sockets 26' spaced inwardly from sockets 26 to receive restraining walls 28 in accommodation of smaller size bales. As shown in FIG. 7, the bale B and its pallet 18 are in condition for transportation to a precise predetermined position in a bale assembly area as defined in my said co-pending application entitled FIBER HANDLING SYSTEM.

It will be obvious that many variations and modifications may be made in the present invention without departing from the spirit and scope thereof.

I claim:

1. The method of removing the straps and wrapping from a compressed bale of fibers and simultaneously palletizing the bale which comprises:

a. positioning one surface of the bale against a pallet, b. clamping said pallet and bale together, c. rotating the bale and pallet together to a first position with the pallet on top of the bale, d. severing the straps, e. unclamping the bale and pallet and raising the pallet out of engagement with the bale, f. removing the wrapping and strapping from said one surface of the bale, g. lowering the pallet back into engagement with the bale and clamping the bale and pallet together again h. rotating the pallet and bale together to a second position with the pallet underneath the bale, i. unclamping the bale and pallet while in the second position, and j. removing the wrapping and strapping from the surface of the bale opposite said one surface and leaving the bale on the pallet.

2. A method according to claim 1 wherein said pallet is initially located in a vertical position preparatory to setp (b) in claim 1.

* * * * *